United States Patent
Chang et al.

(10) Patent No.: US 8,560,714 B2
(45) Date of Patent: Oct. 15, 2013

(54) MESSAGE PROCESSING TO IMPROVE SERVER PERFORMANCE

(75) Inventors: Max W C Chang, Taipei (TW); Matt M H Lee, Taipei (TW); Zhiyong Liang, Jiaxing Park (CN); Jeffrey C H Liu, Taipei (TW); Joey H Y Tseng, Taipei (TW); Ming-Jun Xiao, Taipei (TW); Wei Xue, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/787,670

(22) Filed: May 26, 2010

(65) Prior Publication Data
US 2010/0306398 A1 Dec. 2, 2010

(30) Foreign Application Priority Data
May 27, 2009 (TW) ................................ 98117752 A (51) Int. Cl.
*G06F 15/16* (2006.01)

(52) U.S. Cl.
USPC ......................................................... 709/230

(58) Field of Classification Search
None
See application file for complete search history.

(56) References Cited

U.S. PATENT DOCUMENTS

| | | | |
|---|---|---|---|
| 2006/0198309 A1 | 9/2006 | Cortes et al. | |
| 2006/0215695 A1 | 9/2006 | Olderdissen | |
| 2007/0100866 A1* | 5/2007 | Binding et al. | 707/102 |
| 2007/0162613 A1 | 7/2007 | O'Neill et al. | |
| 2007/0226361 A1* | 9/2007 | Shaikh et al. | 709/230 |

* cited by examiner

*Primary Examiner* — Scott Christensen
(74) *Attorney, Agent, or Firm* — Marcia L. Doubet (57) ABSTRACT

A communication server, including a partial parser module, a storage module and a lookup module, is provided. The partial parser module parses some, but not all, strings of a message and generates partial parsed data. The storage module stores pre-parsed data which represents a complete parsing of a message. The lookup module looks for the corresponding pre-parsed data from the storage module, using the partial parsed data. The server sends the message according to at least the corresponding pre-parsed data.

20 Claims, 6 Drawing Sheets

MESSAGE PROCESSING TO IMPROVE SERVER PERFORMANCE

CROSS REFERENCE TO RELATED APPLICATIONS

This application claims priority of Taiwan Patent Application Serial No. 98117752 entitled "COMMUNICATION SERVER AND METHOD OF PROCESSING MESSAGES UTILIZING THE SERVER", filed on May 27, 2009.

BACKGROUND

The present invention relates to processing messages utilizing a communication server.

There are a variety of application-layer protocols over Internet, such as Hypertext Transfer Protocol (HTTP), Simple Mail Transfer Protocol (SMTP), Session Initiation Protocol (SIP), etc.

Most of these application layer protocols are "text-based" and thus have better extensibility and flexibility in usage. However, when a server receives a text-based message, it will require processing resource to parse the text-based message. It could be envisaged that when messages to be parsed increase, the processor may be unable to take the loading and the server will crash. Particularly in SIP communication, message parsing is one of the most time-consuming operations of a SIP server, where about 25% of total message processing time may be spent in parsing. Therefore the problem mentioned above will be more serious in SIP communication.

BRIEF SUMMARY

One aspect of the present invention comprises performing complete parsing for some messages and partial parsing for other messages (e.g., for messages retransmitted from the client). Therefore, the loading of the server could be eased.

Another aspect of the present invention comprises determining which message needs complete parsing and which message simply needs partial parsing. The determination could have nothing to do with the "method" or "class" of the message.

Still another aspect of the present invention comprises storing the parsed data resulting from the complete parsing for some messages and then applying the parsed data for other messages which simply have partial parsing.

Yet another aspect of the present invention comprises partially parsing some messages and looking up the pre-parsed data with the parsed data resulting from partial parsing (e.g., to determine if the message has previously been completely parsed).

In an embodiment, the communication server includes a partial parser module, a storage module, and a lookup module. The partial parser module parses some, but not all, strings of a message and generates partial parsed data. The storage module stores some pre-parsed data created by completely parsing of at least one previous message. The lookup module looks up corresponding pre-parsed data from the storage module with the partial parsed data. The server sends the message according to at least the corresponding pre-parsed data.

In another embodiment, the communication server includes a first parser module, a second parser module, and a determining module. The first parser module parses a first set of strings of a message to generate first parsed data. The second parser module parses strings other than the first set of strings of the message. The determining module compares the first parsed data with reference data to determine whether to call the second parser module. When the determining module calls the second parser module, the second parser module parses the message to generate second parsed data.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a server, a computer apparatus, a method, or a computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java®, Smalltalk, C++, or the like and conventional procedural programming languages, such as the "C" programming language or similar programming languages. ("Java" is a registered trademark of Oracle Corporation in the United States, other countries, or both.) The program code may execute entirely on the user's computer, partly on the user's computer, as a stand-alone software package, partly on the user's computer and partly on a remote computer, or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider.)

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1A through FIG. 5, systems, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1A:
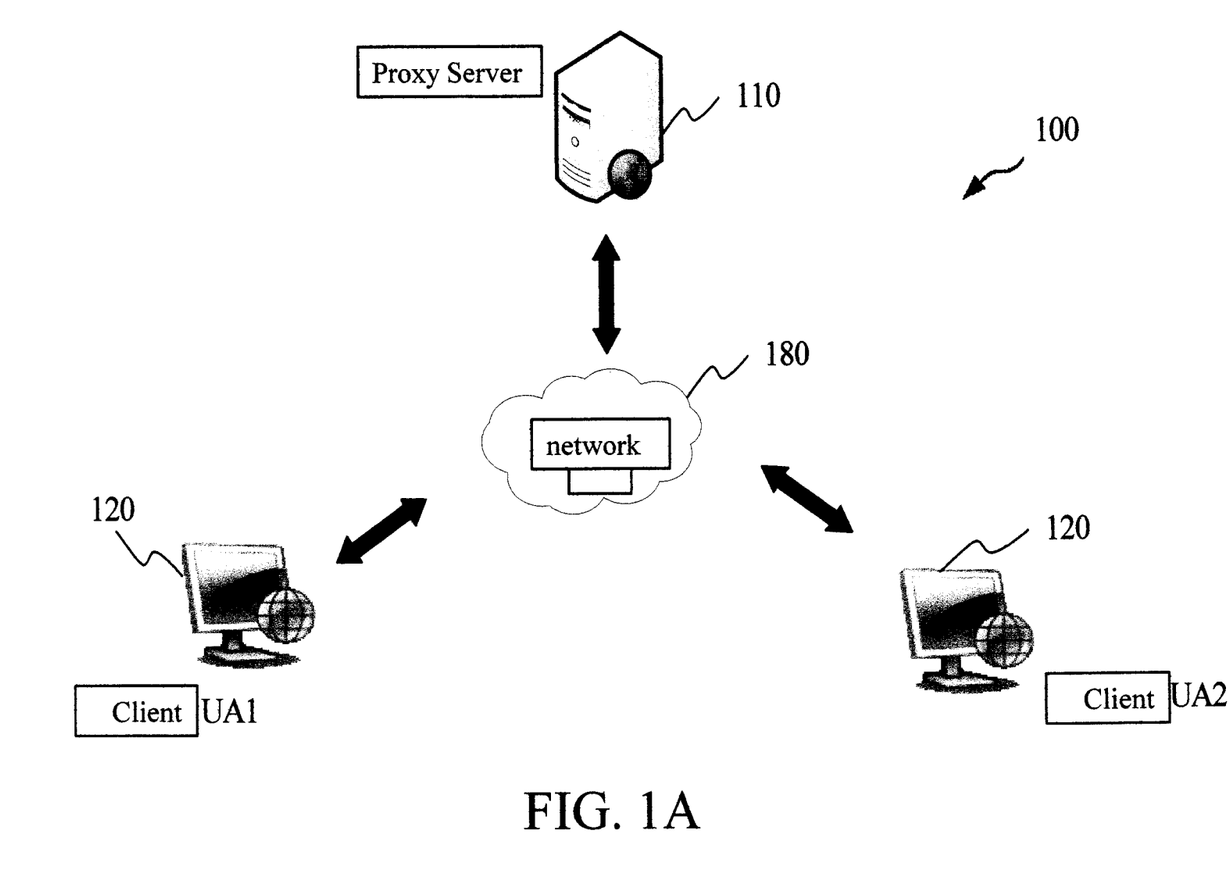
FIG. 1A is an exemplary diagram of a communication system according to an embodiment of the present invention.

FIG. 1A is an exemplary diagram of communication system 100 according to an embodiment of the present invention. The system 100 includes one or more servers 110 and one or more client devices 120, such as a desktop, laptop, mobile device, etc. A server 110 communicates with a client device via the network 180. The network 180 can be any type of network such as the Internet, a local area network (LAN), a wide area network (WAN), a virtual private network (VPN), etc. In any event, communication between the server 110 and the client device 120 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In addition, it should be understood that although not shown, other hardware and software components (e.g., additional computer systems, routers, firewalls, etc.) could be included in the network 180. Preferably, the server 110 is a proxy server, but it could be another server such as a Redirect server, Registrar server, etc.

Figure 1B:
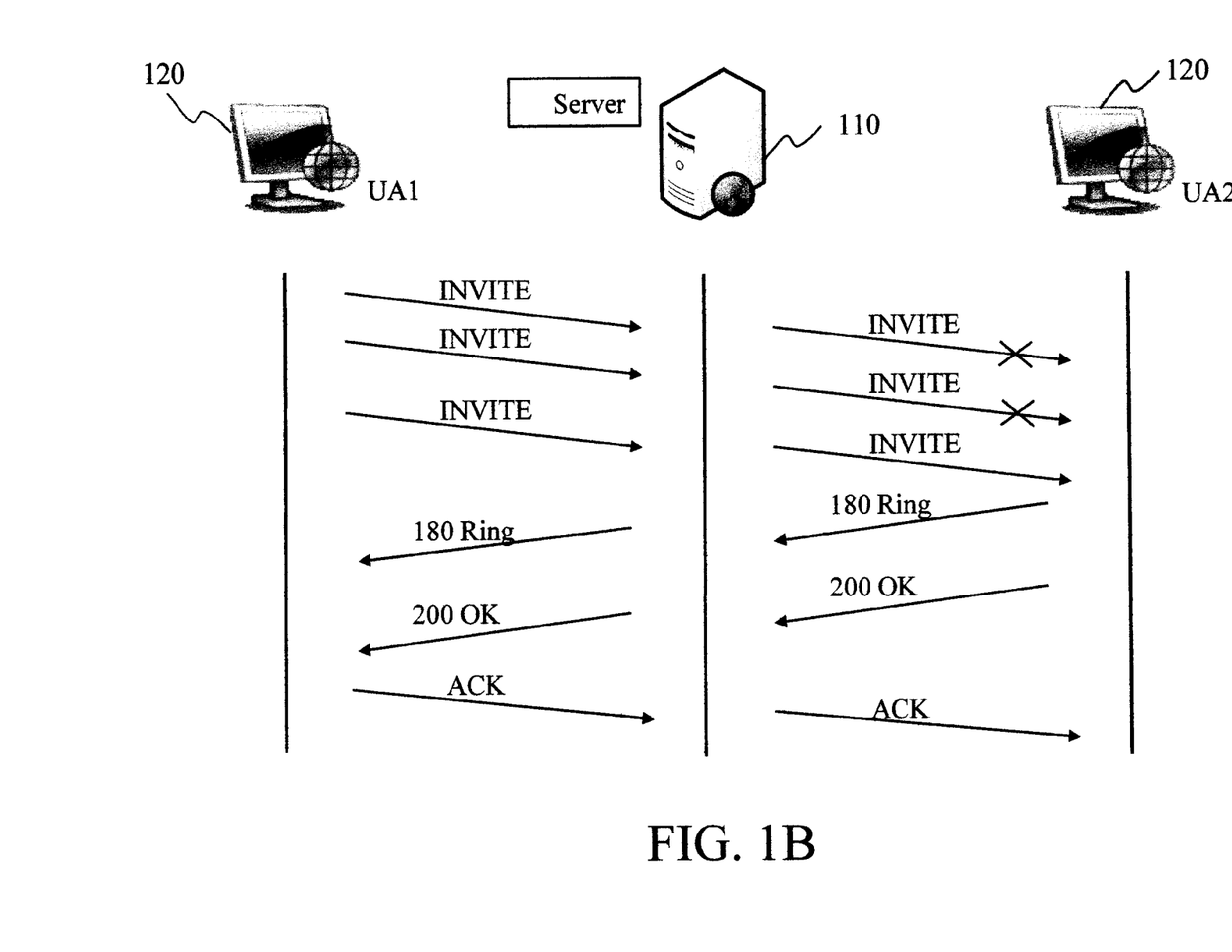
FIG. 1B shows the message communication according to one embodiment of the present invention.

FIG. 1B further shows the communication system 100 according to an embodiment of the present invention. In this example, the communication system 100 is based on SIP protocol. Typically, SIP messages have two categories—namely, Request and Response. RFC 3261 (which is titled "SIP: Session Initiation Protocol" and which is available from the Internet Engineering Task Force, or "IETF") further defines 6 basic types of Request—INVITE, ACK, BYE, CANCEL, REGISTER, OPTIONS. Details of these should be known to those skilled in the art and a discussion thereof is thus omitted hereinafter. In addition, SIP closely resembles HTTP or SMTP. Thus, those skilled in the art should recognize that the present invention could also apply to HTTP or SMTP protocols. In such alternatives, the messages communicated between the server 110 and the client device 120 are similar to the embodiment shown in FIG. 1B, and particularly the header and the code used in the messages are alike. Some differences will be found among protocols; for example, in some protocols, the server 110 will not actively send out a request message.

As shown in FIG. 1B, the client UA1 (username: Danny, in this example) sends an INVITE message to call the client UA2 (username: Carl, in this example). An SIP message includes "start-line", "header", and optional "message-body" fields, such as "Session Description Protocol (SDP)", all of which are composed of strings. The following is an example of an SIP INVITE request message, wherein the "header" follows the start-line (INVITE sip: carl @aaa1.com SIP/2.0, in this example), and SDP is about the multimedia format and is thus omitted in this illustration.

```
INVITE sip: carl @aaa1.com SIP/2.0
Via: SIP/2.0/UDP server.bbb.com; branch=z9hG4bKfw19b
To: Carl <sip: carl@aaa2.com>
From: Danny <sip: danny@ddd.com>; tag=76341
Call-ID: 123456789@server.bbb.com
Cseq: 1 INVITE
Contact: <sip: danny@ddd.com>
Content-Type: application/sdp
Content-Length: 142
(SDP is not shown)
```

When receiving this INVITE message from the client UA1, the server 110 will query the actual address of the client UA2, and will forward this INVITE message to the client UA2. When receiving this INVITE message from the server 110, the client UA2 will respond to the server 110 with a 180 response (defined as "RINGING" in SIP) and a 200 response (defined as "OK" in SIP) messages, and the server 110 will forward these response messages back to the client UA1. Then the client UA1 will send an ACK message to UA2, and after that the communication between clients UA1 and UA2 is successfully created. More details of this exchange are specific to the SIP protocol and are thus omitted from discussion herein.

Note that when the server 110 sends the INVITE message to the client UA2, it is possible that the client UA2 fails to receive the message—for example, because of the loss of packets. Accordingly, the client UA2 will not return 180 response (RINGING) and 200 response (OK) messages. And because of not receiving the response, the client UA1 will repeat sending the INVITE message to the server 110. See FIG. 1B, which illustrates client UA1 120 sending an INVITE message unsuccessfully twice before client UA2 receives the INVITE message in a third transmission. Without additional arrangement, the server 110 would require extra processing resources to parse these repeated INVITE messages, which are substantially identical to each other.

Figure 2:
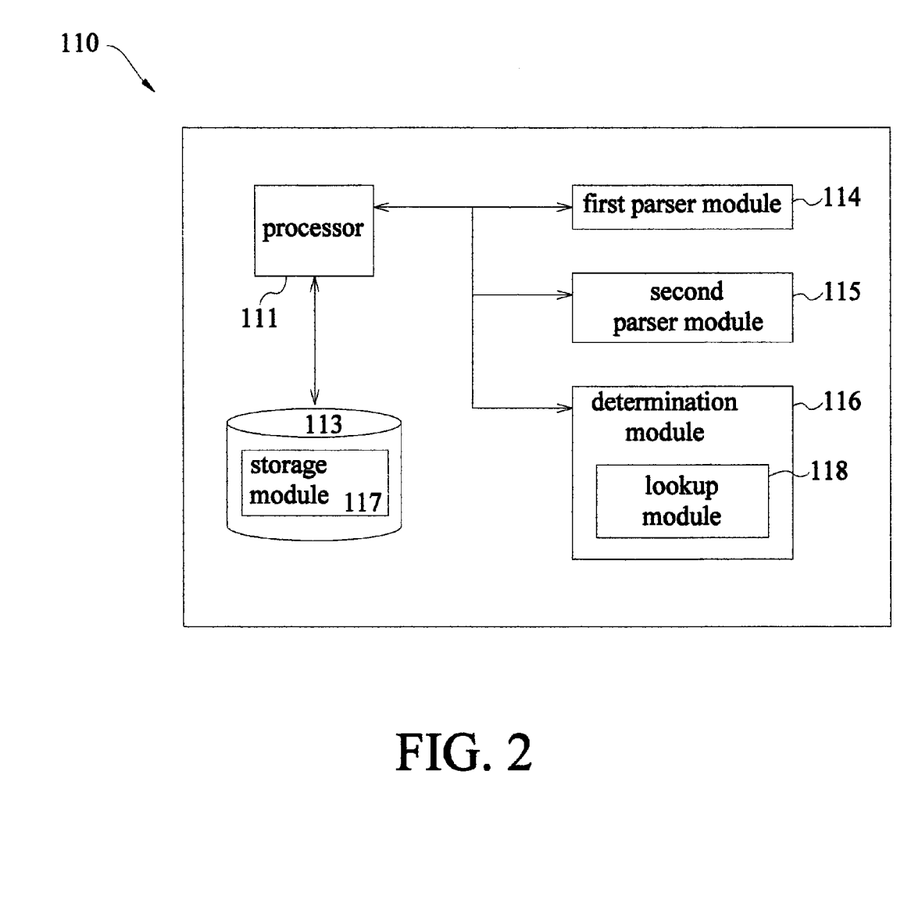
FIG. 2 illustrates a communication server according to one embodiment of the present invention.

FIG. 2 shows the server 110 according to an embodiment of the present invention. As shown, the server 110 has a processor 111 and a storage device 113. In addition, the server 110 can have buses, I/O interface, input or output devices (such as keyboard and display), memories, caches, a communication system, and server software, which are not shown in FIG. 2.

The processor 111 could be a processor for a general information service server, such as Xeon® of Intel Corporation, and Athlon® or Opteron® of Advanced Micro Devices. ("Xeon" is a registered trademark of Intel Corporation in the United States, other countries, both. "Athlon" and "Opteron" are registered trademarks of Advanced Micro Devices, Inc. in the United States, other countries, or both.) Note that the server 110 may have more than one processor 111 and/or more than one storage device 113 (such as a hard disk drive or an optical disk drive). In another embodiment, the storage device 113 can have data stored in distributed storage such as a LAN, a WAN, or a storage area network (SAN). The processor 111 executes an application program to provide a first parser module 114, a second parser module 115, a determination module 116, and a lookup module 118 (where lookup module 118 is illustrated in FIG. 2 as being embodied within determination module 116). Meanwhile, the processor 111 can access or read/write a storage module 117 in the storage device 113.

The first parser module 114, also called the partial parser module, is provided for parsing some, but not all, strings of a message (e.g., an INVITE request) received by the server 110. In contrast, to ensure the correct processing and the transmission for the message and to make a message recipient able to read the message, a conventional parser module needs to parse all strings of the message, e.g., all strings in the "start-line" and "header" for an SIP message. Note that the term "parse" or "parsing" means, for example but not limited to, parsing a header into data in key-value pairs. In other words, when a header is being parsed, an item or a field of the header is taken as the key, and the value of the item or the field is taken as the value of the key-value pair. For example, when parsing "Via: SIP/2.0/UDP server.bbb.com; branch=z9hG4bKfw19b", "Via" is the key, and "SIP/2.0/UDP server.bbb.com; branch=z9hG4bKfw19b" is the value of the key-value pair.

In this embodiment, the first parser module 114 parses fewer strings than a conventional parser. Therefore, the parsed data generated by the first parser module 114 (i.e., the partial parsed data) may be insufficient for the server 110 to ensure the correct processing and the transmission for the message and to make a message recipient (i.e., the client UA2, in the example) able to read the message. However, compared to the conventional parser, the first parser module 114 consumes less processing resource of the server 110. Take an SIP INVITE message, for example. The first parser module 114 might parse only the Branch ID (i.e., "branch=z9hG4bKfw19b") field from the header and the Request URI (i.e., "sip: carl @aaa1.com) field from the start-line. Or, the first parser module 114 might further parse the "From" field (i.e., "Danny <sip: danny@ddd.com>", in the example) and/or the "To" field (i.e., "Carl <sip: carl@gaaa2.com>", in the example) from the header. Alternatively, the first parser module 114 can parse other strings, as long as the string is unique to the message and recognizable by the server 110, regardless of whether the server can correctly process the message using the alternative parsed data generated by the first parser module 114. However, note that the first parser module 114 will need more processing resource to parse more strings.

The second parser module 115 is provided for at least parsing strings other than the strings which have been parsed by the first parser module 114. In an embodiment, the second parser module 115 could be embodied as a conventional parser, and the strings parsed by this conventional parser have to be sufficient for the server 110 to ensure the correct processing and the transmission for the message and to make a message recipient able to read the message. In other words, the second parser module 115 may parse all strings of the message, including those strings which have already been parsed by the first parser module 114. In another embodiment, the second parser module 115 parses only strings which have not been parsed by the first parser module 114, such as the value of the Content-Type field (i.e., "application/sdp", in the example). Note that in any event, the server 110 should be able to ensure the correct processing and the transmission for the message and to make a message recipient able to read the message, after the parsing by the first parser module 114 and the second parser module 115 (which together process all strings of the message, including potential overlap in the parsing of some strings).

The determination module 116 is provided for comparing the first parsed data (i.e., the partial parsed data generated by the first parser module 114) with reference data to determine whether to call the second parser module 115 after the parsing of the first parser module 114. If the second parser module 115 is called, it will parse all strings of the message or, in an alternative approach, the strings which have not been parsed by the first parser module 114. For example, the determination module 116 can determine if a Request URI parsed by the first parser module 114 has the same (or different) value as a predetermined URI, before determining whether to call the second parser module 115. The reference data could be any data pre-loaded to the server 110. An example of the reference data will be discussed below with reference to FIG. 3.

In another embodiment, the server 110 further has a storage module 117 for storing some pre-parsed data and a lookup table TA (discussed below with reference to FIG. 3), and the determination module 116 further has a lookup module 118 to access the storage module 117. In an embodiment, suppose that a prior message previously received by the server 110 from the client UA1 is substantially identical to a current message to be processed by the server 110. The pre-parsed data stored in the storage module 117 may include the parsed data of the prior message which resulted from complete parsing (i.e., all strings are parsed), and this pre-parsed data can then be used for the current message (instead of reparsing the substantially identical information). In another embodiment, the pre-parsed data stored in the storage module 117 may include the parsed data of a message previously received by the server 110 from another client, where this pre-parsed stored data resulted from complete parsing of the other client's message. As another alternative, the pre-parsed data could be a copy of parsed data provided by another server (not shown) on the network 180.

Figure 3:
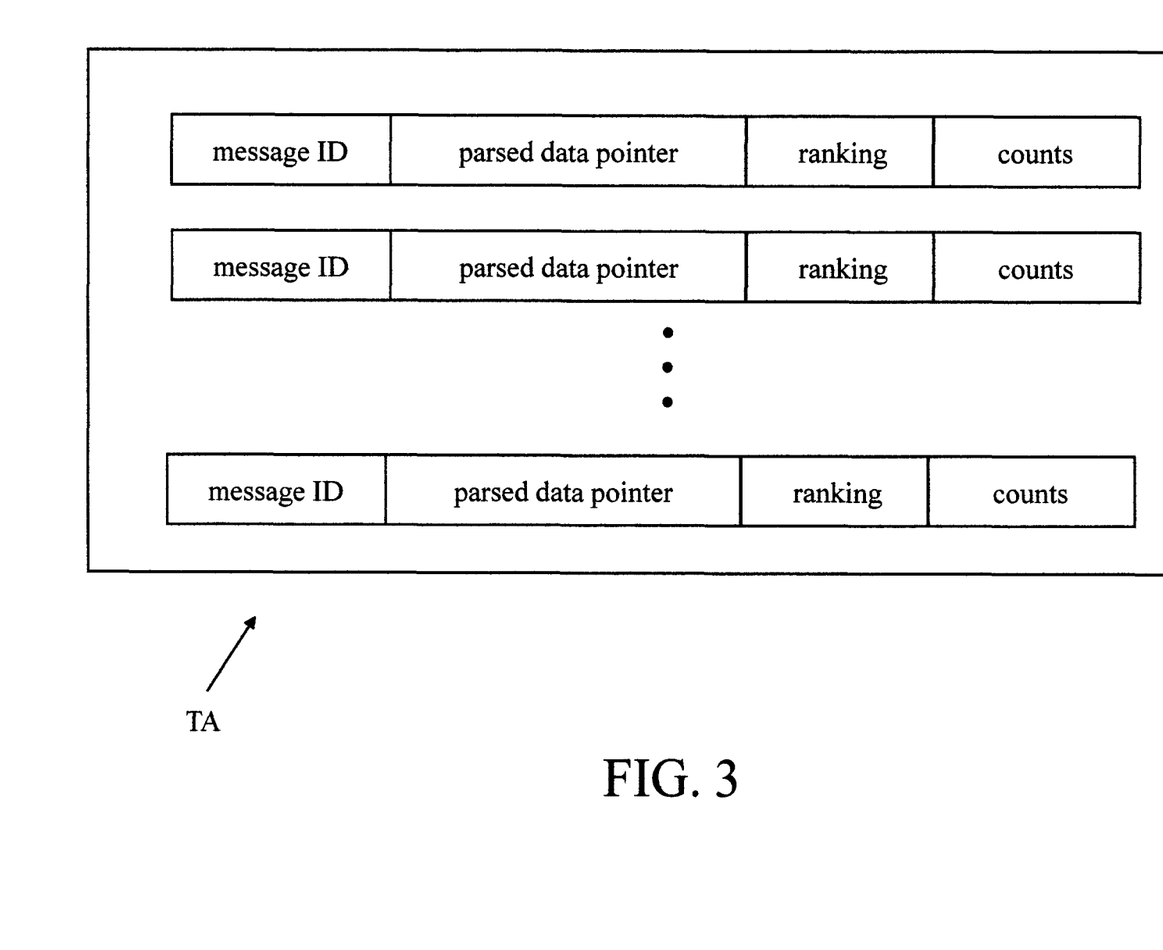
FIG. 3 shows a lookup table according to one embodiment of the present invention.

Preferably, the storage module 117 could be a cache, and FIG. 3 shows an embodiment of the lookup table TA in the storage module 117. The lookup table TA has at least two fields—namely, "message ID" and "parsed data pointer". In this embodiment, "message ID" and the partial parsed data generated by the first parser module use the same data format, so the lookup module 118 is able to use the partial parsed data for looking up the corresponding message ID from the lookup table TA, and if found, can further use the corresponding "parsed data pointer" to obtain the corresponding pre-parsed data. Then the server 110 can apply the corresponding pre-parsed data to process or transmit the current message. Accordingly, because the second parser module 115 does not have to parse the current message, the server 110 can save some processing resources.

However, if the lookup module 118 cannot find a corresponding pre-parsed data from the lookup table TA, the server 110 will not apply any pre-parsed data to the current message. Thus, after the parsing by the first parser module 114, the determination module 116 will call the second parser module 115 to generate complete parsed data by parsing all strings of the message or, in an alternative approach, the strings which have not been parsed by the first parser module 114. In this case, the storage module 117 can further be updated by storing the parsed data generated for the current message by the first parser module 114 and the second parser module 115 together as new pre-parsed data for future use.

In addition, the storage module 117 may only have limited storage space for storing pre-parsed data. Therefore, when "new" pre-parsed data is added to the storage module 117, "old" pre-parsed data may need to be deleted. As shown in FIG. 3, the lookup table TA can have a "ranking" field. For example, the storage module 117 may give a different ranking for different methods or classes of the message. In an embodiment, an INVITE message has a higher ranking than a REGISTER message. Therefore, a message with a lower ranking may be deleted first, when necessary. Also the storage module 117 can have a "count" field, which represents how many times a specific pre-parsed data is applied by the server 110. Then the storage module 117 can apply the "Least Recently Used (LRU)" or "Most Recently Used" strategy with the "count" field to delete some pre-parsed data. Accordingly, when a specific pre-parsed data is applied, its "count" will be updated in the lookup table TA.

Figure 4:
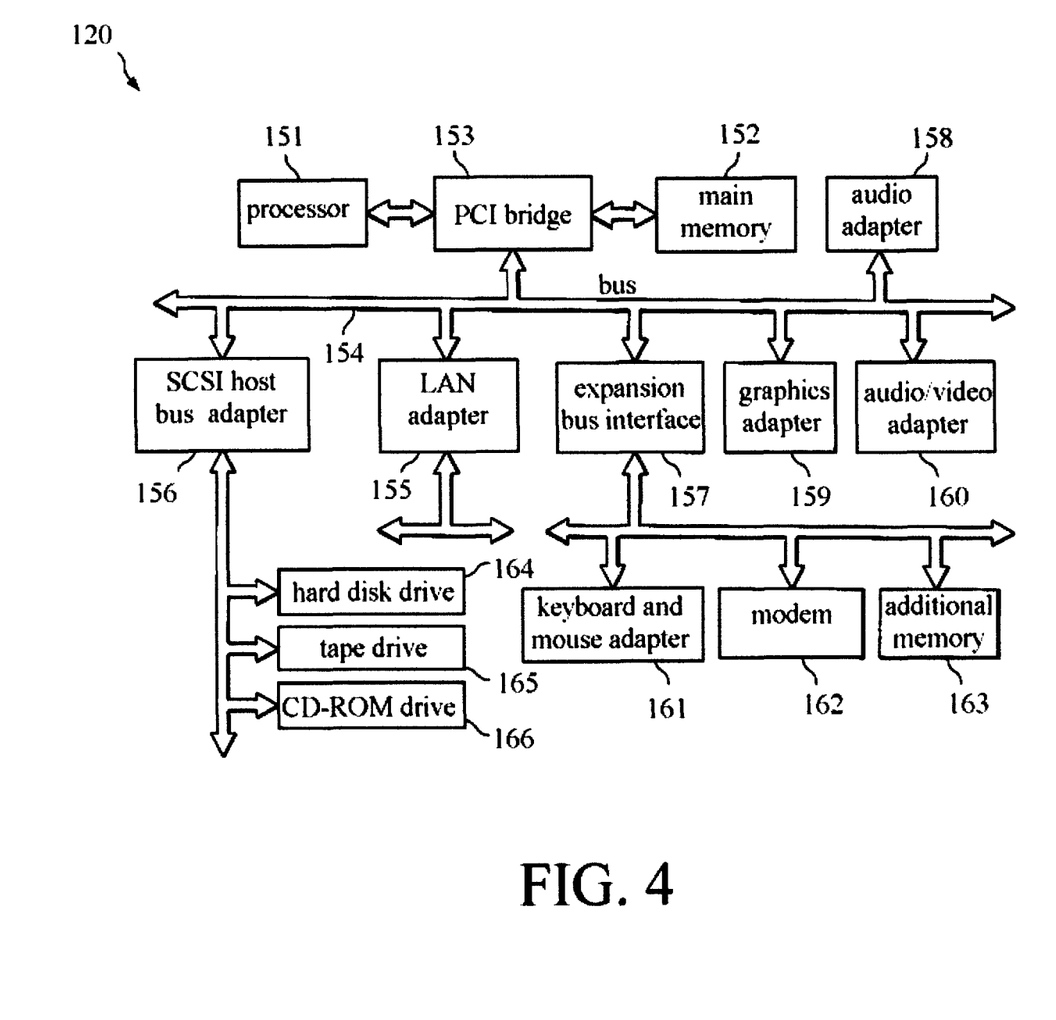
FIG. 4 illustrates a client device according to one embodiment of the present invention.

FIG. 4 is an exemplary block diagram of a client device 120 according to one embodiment of the present invention. The client device 120 employs a peripheral component interconnect (PCI) local bus architecture. Although the depicted example employs a PCI bus, other bus architectures such as Accelerated Graphics Port (AGP) and Industry Standard Architecture (ISA) may be used. Processor 151 (e.g., a CPU of Intel Corporation or Advanced Micro Devices, Inc.) and main memory 152 are connected to PCI local bus 154 through PCI bridge 153. PCI bridge 153 also may include an integrated memory controller and cache memory for processor 151.

In the depicted example, local area network (LAN) adapter 155, small computer system interface (SCSI) host bus adapter 156, and expansion bus interface 157 are connected to PCI local bus 154 by direct component connection. In contrast, audio adapter 158, graphics adapter 159, and audio/video adapter 160 are connected to PCI local bus 154 by add-in boards inserted into expansion slots. Expansion bus interface 157 provides a connection for a keyboard and mouse adapter 161, modem 162, and additional memory 163. SCSI host bus adapter 156 provides a connection for hard disk drive 164, tape drive 165, and CD-ROM drive 166. Typical PCI local bus 154 implementations will support three or four PCI expansion slots or add-in connectors.

An operating system runs on the processor 151 and is used to coordinate and provide control of various components within the computer apparatus 110 and is also used to execute applications/programs with graphical user interfaces (GUIs). The operating system may be a commercially available operating system such as Windows XP® of Microsoft Corporation, which is a GUI characterized operating system. ("Windows XP" is a registered trademark of Microsoft Corporation in the United States, other countries, or both.) Instructions for the operating system and applications or programs are located on storage devices, such as the hard disk drive 164, and may be loaded into the main memory 152 for execution by the processor 151. The processor 151 also executes client processes to communicate with the server 110 via the network 180. Note that the client 120 and the server 110 may use a similar hardware architecture.

Figure 5:
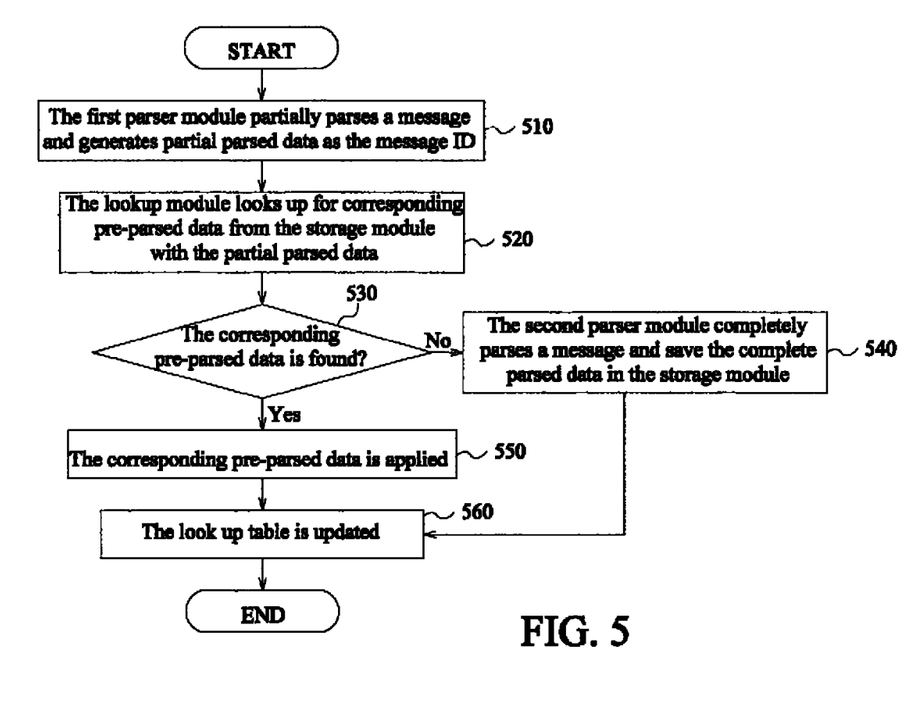
FIG. 5 is a flowchart according to one embodiment of the present invention.

In the following, an embodiment of a method will be provided to explain the present invention in association with the server 110 shown in FIG. 1 and the flowchart in FIG. 5. Before performing the method, the storage module 117 stores some pre-parsed data and creates the lookup table TA. At step 510, the server 110 receives a message from the client (referred to as UAL in the example), and the first parser module 114 partially parses the message. For example, the first parser module 114 may generate partial parsed data as a message ID by only parsing some of the strings in the header, such as values of Request URI, Branch ID, "To" field, or "From" field.

Then at step 520, the lookup module 118 looks up the corresponding pre-parsed data in the lookup table TA using the message ID (i.e., the partial parsed data). At step 530, if there is no corresponding pre-parsed data found, the method proceeds to step 540.

At step 540, because there is no corresponding pre-parsed data suitable for the current task of the server 110, the second parser module 115 needs to have a complete parsing, to provide sufficient parsed data for the sever 110 to process and transmit the message correctly. The parsed data generated by the second parser module 115 could be further added to the storage module 117 as "new" pre-parsed data for future use. The method now goes to step 560 to update the lookup table TA of the storage module 117 to add this new pre-parsed data.

Now back to step 530, if corresponding pre-parsed data is found, the method goes to step 550. At step 550, the server 110 can apply the corresponding pre-parsed data to process and transmit the message without having to perform a complete parsing, so the load on the processing resources can be eased. Then at step 560, the field "count" is updated. The storage module 117 can refer to the fields "ranking" and "count" when determining which pre-parsed data could be deleted first to free up storage, as discussed earlier.

With the arrangement shown above, the processing load on resources of the server could be eased by applying the pre-parsed data. It will be useful when the network is not stable and the message sender repeatedly re-sends identical messages to the server because the message sender does not receive any response or acknowledgement (as discussed above with reference to FIG. 1B). With the present invention, the server simply needs to "completely" parse a message that is first received and store the parsed data. When later the server receives the same or similar message, the server can apply the parsed data obtained previously, without wasting processing resources by completely parsing the message again.

The description shown above is only about preferred embodiments of the present invention and is not intended to limit the scope of the invention. Any variations or modifications that may be made without departing from the spirit disclosed by the present invention should be construed to be included in the appended claims.

The invention claimed is:

1. A communication server for processing a message, the server comprising:
a computer comprising a processor; and
instructions which are executable, using the processor, to implement functions comprising:
  parsing a portion of a message header of a message, but not all of the message header, the portion comprising a message identifier that is unique to the message;
  using the parsed message identifier for looking up a matching entry in a storage module, the storage module containing at least one entry, wherein:
    each entry comprises a previously-parsed message identifier stored therein responsive to a complete parsing of the message header of a corresponding previously-processed message; and
    each entry is usable for retrieving a result of the complete parsing of the message header of the corresponding previously-processed message; and
  responsive to locating the matching entry by the looking up, retrieving the result of the complete parsing and using the retrieved result when sending the message from the communication server to an intended recipient of the message.

2. The communication server according to claim 1, wherein the message header comprises a plurality of key-value pairs.

3. The communication server according to claim 1, wherein the message is a Session Initiation Protocol (SIP) Request message.

4. The communication server according to claim 3, wherein the message identifier comprises values of Branch ID and Request URI fields of the SIP Request message.

5. The communication server according to claim 4, wherein the parsed portion further comprises values of a "From" field and a "To" field in the message header of the SIP Request message.

6. The communication server according to claim 1, wherein each of the at least one entry stores, in association with the previously-parsed message identifier, a pointer to a location that stores the result of the complete parsing of the message header of the corresponding previously-processed message.

7. A method for processing a message by a communication server, the method comprising:
  parsing a first set of strings of a message header of a message, but not all strings of the message header, the first set of strings comprising a message identifier that is unique to the message;
  comparing the parsed message identifier to at least one previously-parsed message identifier to determine whether to parse strings of the message header other than the first set of strings, each of the at least one previously-parsed message identifier stored in association with previously-parsed data generated responsive to a complete parsing of all strings of the message header of a corresponding previously-processed message;
  if the comparing determination is to parse the other strings, then parsing the strings other than the first set of strings of the message header to generate, in combination with the parsed first set of strings, a complete parsing of the message header and using the generated complete parsing when sending the message from the communication server to an intended recipient of the message; and
  if the comparing determination is not to parse the other strings, then using the parsed message identifier to retrieve the previously-parsed data generated responsive to the complete parsing of the message header of the corresponding previously-processed message and using the retrieved previously-parsed data when sending the message from the communication server to the intended recipient.

8. The method according to claim 7, wherein:
when the comparing finds a match between the parsed message identifier and one of the at least one previously-parsed message identifier, the comparing determination is to not parse the other strings; and
when the comparing does not find the match, the comparing determination is to parse the other strings.

9. The method according to claim 7, further comprising:
storing, when the comparing determination is to parse the other strings, the generated complete parsing of the message header as previously-parsed data in association with the parsed message identifier.

10. The method according to claim 7, wherein the message header comprises a plurality of key-value pairs.

11. The method according to claim 7, wherein the parsed other strings comprise at least one string which is not unique to the message.

12. The method according to claim 7, wherein the message is a Session Initiation Protocol (SIP) Request message.

13. The method according to claim 12, wherein the message identifier comprises values of Branch ID and Request URI fields of the SIP Request message.

14. The method according to claim 13, wherein the first set of strings parsed further comprises values of "From" and "To" fields in the message header of the SIP Request message.

15. A computer program product for processing a message, the computer program product comprising:
at least one non-transitory computer readable storage medium having computer readable program code embodied therein, the computer readable program code configured for:
parsing, by a first parser module, a first set of strings of a message header of a message to generate first parsed data, the first set of strings comprising some, but not all, strings of the message header and containing a message identifier that is unique to the message;
parsing, by a second parser module, a second set of strings of the message header to generate second parsed data, the second set of strings comprising strings of the message header other than the first set of strings; and
determining, responsive to comparing the first parsed data to reference data, whether to parse the second set of strings with the second parser module, the reference data comprising previously-parsed data generated from parsing all strings of the message header at least one previously-processed message.

16. The computer program product according to claim 15, further comprising computer readable program code configured for storing the first parsed data and the second parsed data, for at least one processed message, as previously-parsed data.

17. The computer program product according to claim 15, wherein the message header comprises key-value pairs.

18. The computer program product according to claim 15, wherein the parsed other strings comprise at least one string which is not unique to the message.

19. The computer program product according to claim 15, wherein the message is a Session Initiation Protocol (SIP) Request message.

20. The computer program product according to claim 19, wherein the message identifier comprises values of Branch ID and Request URI fields of the SIP Request message.

* * * * *